US012689192B2

(12) United States Patent
Yogeeswaran et al.

(10) Patent No.: US 12,689,192 B2
(45) Date of Patent: Jul. 21, 2026

(54) OBJECT-SENSING SYSTEMS AND ROBOTIC SYSTEMS INCLUDING THE SAME

(71) Applicant: Meta Platforms, Inc., Menlo Park, CA (US)

(72) Inventors: Karthik Yogeeswaran, San Carlos, CA (US); Andrew Todd Grier, Philadelphia, PA (US)

(73) Assignee: Meta Platforms, Inc., Menlo Park, CA (US)

( * ) Notice: Subject to any disclaimer, the term of this patent is extended or adjusted under 35 U.S.C. 154(b) by 678 days.

(21) Appl. No.: 17/880,044

(22) Filed: Aug. 3, 2022

(65) Prior Publication Data

US 2023/0057777 A1     Feb. 23, 2023

Related U.S. Application Data

(60) Provisional application No. 63/234,603, filed on Aug. 18, 2021.

(51) Int. Cl.
H02G 1/02 (2006.01)
G01V 8/20 (2006.01)
(Continued)

(52) U.S. Cl.
CPC ................ H02G 1/02 (2013.01); G01V 8/20 (2013.01); G02B 3/08 (2013.01); G02B 5/20 (2013.01);
(Continued)

(58) Field of Classification Search
CPC ... H02G 1/02; G01V 8/20; G02B 3/08; G02B 5/20; G02B 6/48; G02B 27/0927;
(Continued)

(56) References Cited

U.S. PATENT DOCUMENTS 4,911,307 A    3/1990  Jennings
5,504,573 A *  4/1996  Cheiky-Zelina ... G01N 15/0266
                                            356/70
(Continued)

FOREIGN PATENT DOCUMENTS

CH          620031 A5    10/1980
CN      203178572 U  *  9/2013
(Continued)

OTHER PUBLICATIONS

International Preliminary Report on Patentability for International Application No. PCT/US2022/040704, mailed Feb. 29, 2024, 13 pages.
(Continued)

*Primary Examiner* — Jennifer D Bennett
(74) *Attorney, Agent, or Firm* — EVERSHEDS SUTHERLAND (US) LLP

(57)     ABSTRACT

Object-sensing systems including a light transmitter subsystem and a light receiver subsystem. The light transmitter subsystem main be configured to generate a collimated linear beam of light at a predetermined wavelength and having a length of at least 3 inches. The light receiver subsystem may include a linear sensor array having a length of at least 3 inches. The linear sensor array may be positioned to receive the collimated linear beam of light and to detect shadows caused by objects blocking at least a portion of the collimated linear beam of light. Various other systems and methods are also disclosed.

18 Claims, 10 Drawing Sheets

600

(51) Int. Cl.

| | |
|---|---|
| *G02B 3/08* | (2006.01) |
| *G02B 5/20* | (2006.01) |
| *G02B 6/48* | (2006.01) |
| *G05D 1/622* | (2024.01) |
| *G05D 111/10* | (2024.01) |
| *G06V 20/58* | (2022.01) |

(52) U.S. Cl.
CPC ............. *G05D 1/622* (2024.01); *G06V 20/58* (2022.01); *G02B 6/48* (2013.01); *G05D 2111/10* (2024.01)

(58) Field of Classification Search
CPC .............. G02B 27/0966; G05D 1/622; G05D 2111/10; G06V 20/58
See application file for complete search history.

(56) References Cited

U.S. PATENT DOCUMENTS

| | | | | |
|---|---|---|---|---|
| 5,591,964 A | * | 1/1997 | Poole ........................ | G01J 1/44 385/32 |
| 5,923,021 A | * | 7/1999 | Dvorkis ............ | G06K 7/10742 235/455 |

| | | | | |
|---|---|---|---|---|
| 2004/0136100 A1 | * | 7/2004 | Torii ........................ | G01V 8/14 359/831 |
| 2007/0291373 A1 | * | 12/2007 | Hu ...................... | H01S 3/09415 359/641 |
| 2015/0346118 A1 | * | 12/2015 | Cox ........................ | G01V 5/22 378/62 |
| 2020/0358268 A1 | * | 11/2020 | Kuriloff .................. | H02G 1/04 |

FOREIGN PATENT DOCUMENTS

| | | | | | |
|---|---|---|---|---|---|
| CN | 103869385 A | * | 6/2014 | | |
| CN | 109307645 A | * | 2/2019 | ............. | G01W 1/14 |
| JP | H07208939 A | | 8/1995 | | |

OTHER PUBLICATIONS

International Search report and Written Opinion for International Application No. PCT/US2022/040704, mailed Nov. 17, 2022, 15 pages.

\* cited by examiner

200

700

A

A

L

W

900

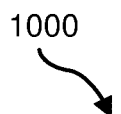

1000

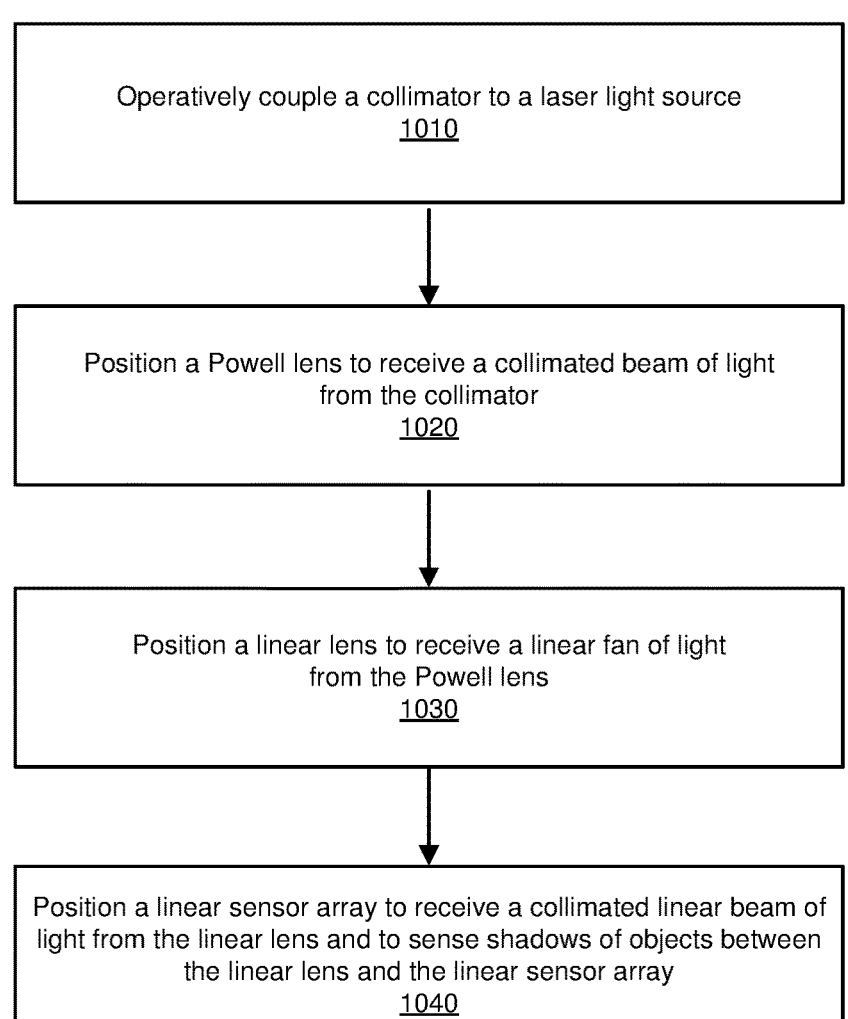

Operatively couple a collimator to a laser light source
1010

Position a Powell lens to receive a collimated beam of light
from the collimator
1020

Position a linear lens to receive a linear fan of light
from the Powell lens
1030

Position a linear sensor array to receive a collimated linear beam of
light from the linear lens and to sense shadows of objects between
the linear lens and the linear sensor array
1040

*FIG. 10*

OBJECT-SENSING SYSTEMS AND ROBOTIC SYSTEMS INCLUDING THE SAME

CROSS REFERENCE TO RELATED APPLICATION

This application claims the benefit of U.S. Provisional Application No. 63/234,603, filed 18 Aug. 2021, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 10 is a flow diagram of a method of object-sensing system, according to at least one embodiment of the present disclosure.

Figure 1:
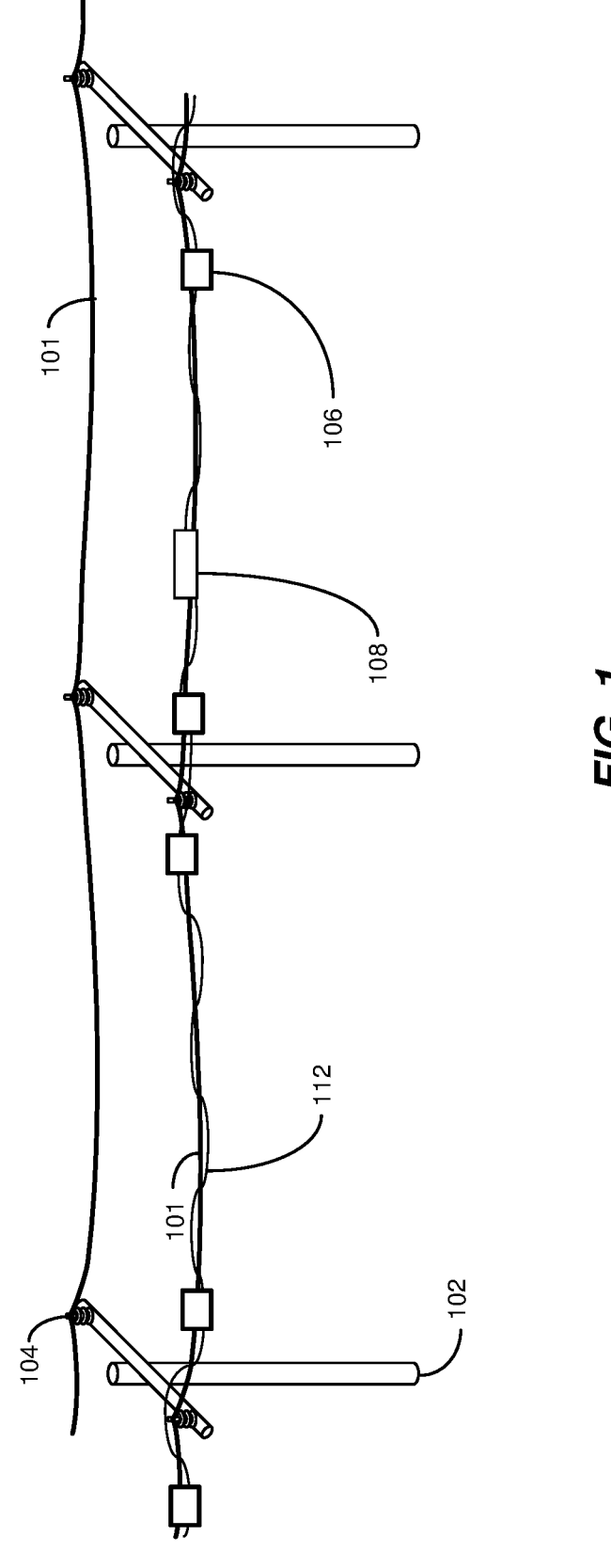
FIG. 1 is a graphical representation of an example operating environment, including a powerline, in which various example embodiments may be employed, according to at least one embodiment of the present disclosure.
Figure 1:
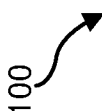

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Robotic devices may be employed to install fiber optic cable or other materials onto preexisting power infrastructure, such as powerline conductors for electrical power transmission and distribution lines, by way of helically wrapping the fiber optic cable or other materials about the powerline conductor. Such an installation may benefit from the use of the preexisting right-of-way and corresponding infrastructure (e.g., power conductors, electrical towers or poles, and so on) associated with the electrical power distribution system. Robotic devices traveling along powerline conductors may also be used for inspection of the powerline conductors. Such a robotic device may include, in some examples, a drive subsystem that causes the robotic device to travel along the powerline conductor (e.g., between towers or poles) while a rotation subsystem of the device helically wraps the fiber optic cable or other materials about the conductor.

While translating along a powerline conductor, such as during cable installation or inspection of the powerline conductor, robotic devices may encounter one or more obstacles (e.g., insulators, taps, and the like), especially along powerline conductors of electrical distribution systems. In such cases, human operators may intervene to temporarily remove and then reattach the robotic device to allow the robotic device to continue to install the cable on the powerline conductor and/or inspect the powerline conductor beyond the encountered obstacle.

Obstacles may be detected using one or more sensors. For example, machine vision sensors such as visible light cameras, radar sensors, or lidar sensors may rely on reflected light to perceive an environment around the robotic device. In some scenarios, such sensors may have difficulty detecting obstacles.

Optical micrometers can detect obstacles using spinning mirrors to step a light beam across a line to detect the shadow of the obstacles in the beam path. Spinning mirror devices can be very large, expensive, and massive in order to scan a large area (e.g., more than 3 inches) for obstacles.

The present disclosure is generally directed to object-sensing systems and robotic systems employing such object-sensing systems. In addition, methods for fabricating these systems are also disclosed. As will be explained in greater detail below, embodiments of object-sensing systems of the present disclosure may include a light transmitter subsystem and a light receiver subsystem. The light transmitter subsystem may be configured to generate a collimated linear beam of light at a predetermined wavelength (e.g., an infrared wavelength), which may have a length of at least 3 inches. The light receiver subsystem may include a linear sensor array that has a length of at least 3 inches. The linear sensor array may be positioned to receive the collimated linear beam of light and to detect shadows caused by objects blocking at least a portion of the collimated linear beam of light. Such systems may be lightweight and low-power, while still effectively detecting objects across a large space. In addition, these object-detection systems may facilitate or enable automatic detection and/or avoidance of obstacles as may be necessary.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 6:
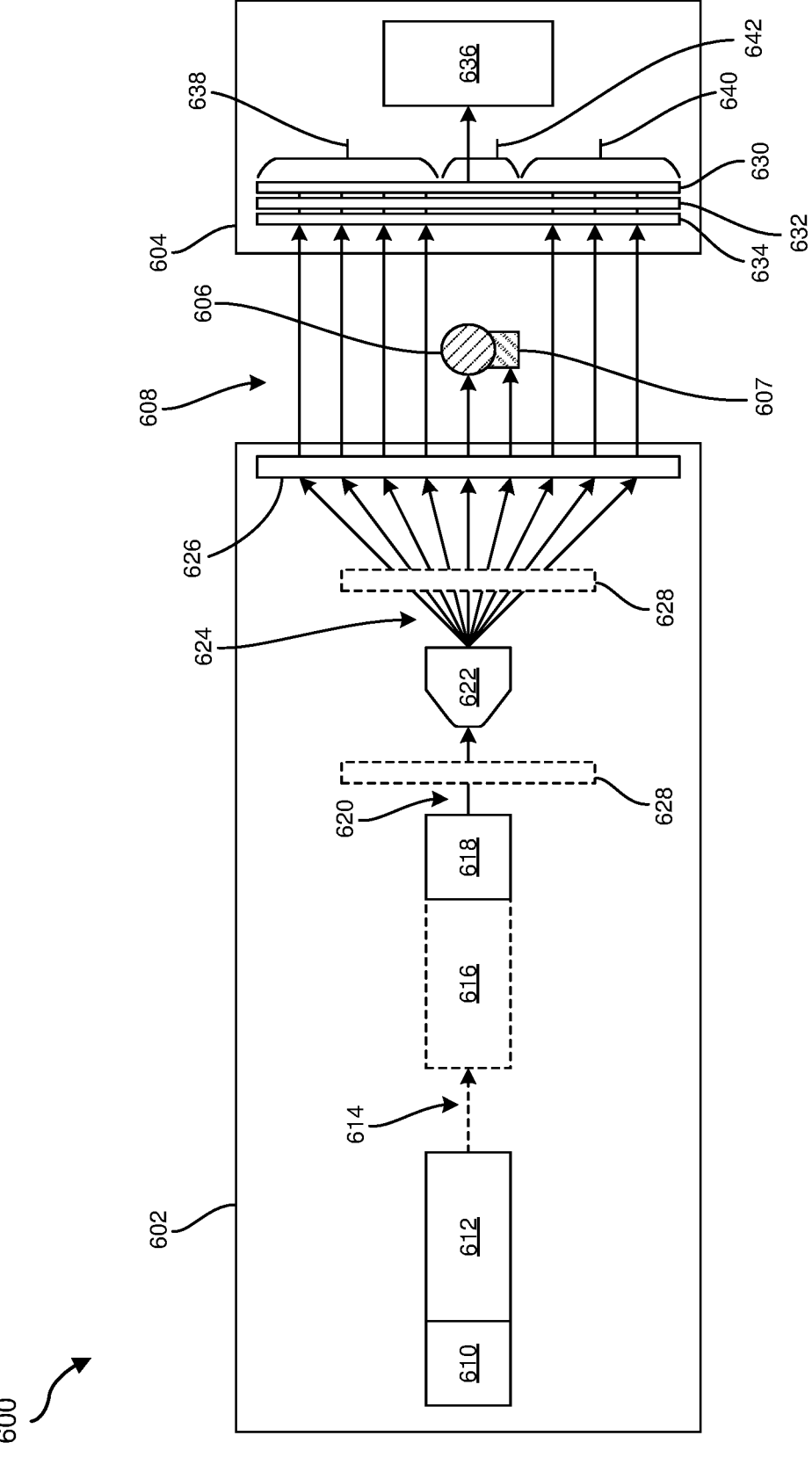
FIG. 6 is a side view of an object-sensing system, according to at least one embodiment of the present disclosure.
Figure 7:
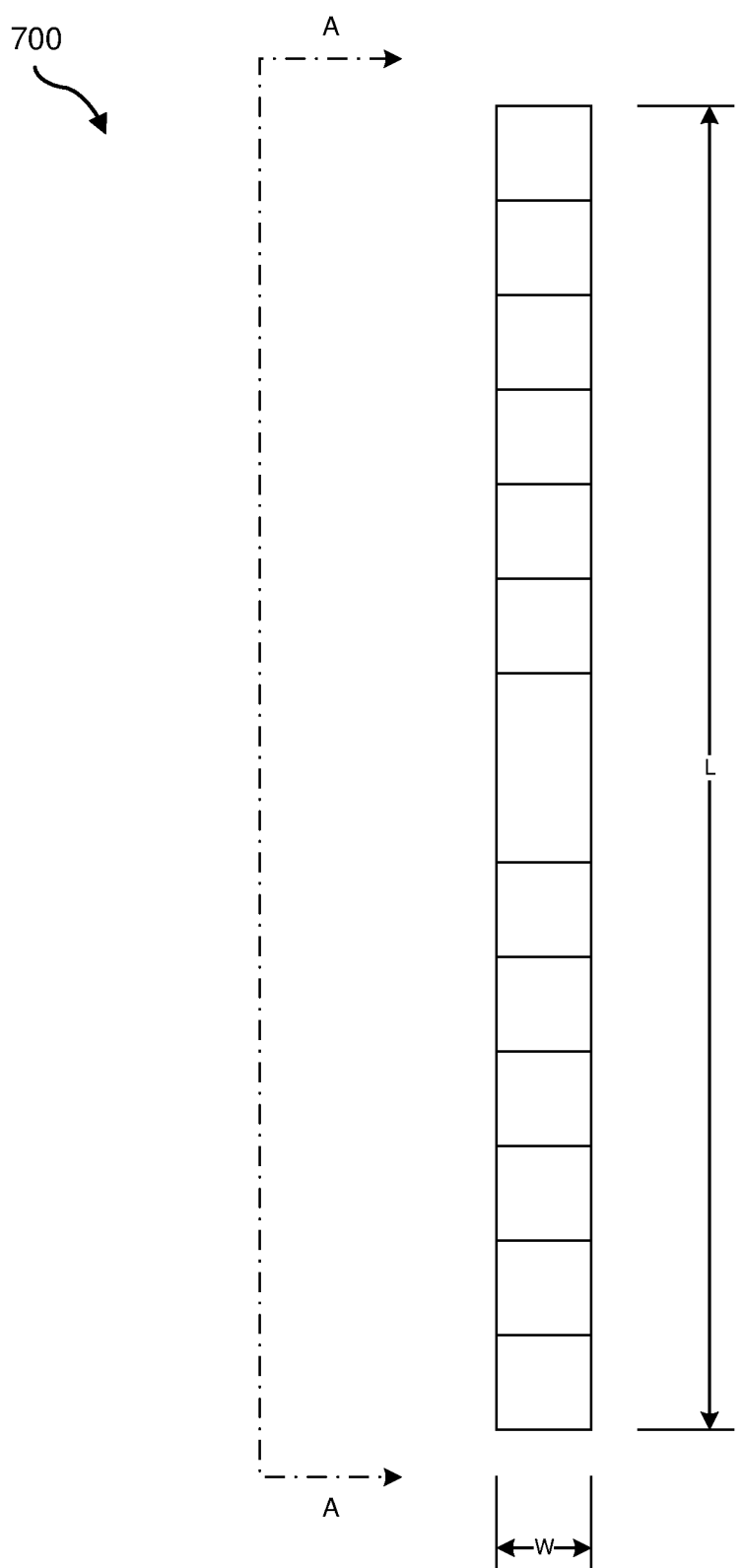
FIG. 7 is a front view of a Fresnel lens that may be employed in the obstacle detection system of FIG. 6, according to at least one embodiment of the present disclosure.
Figure 8:
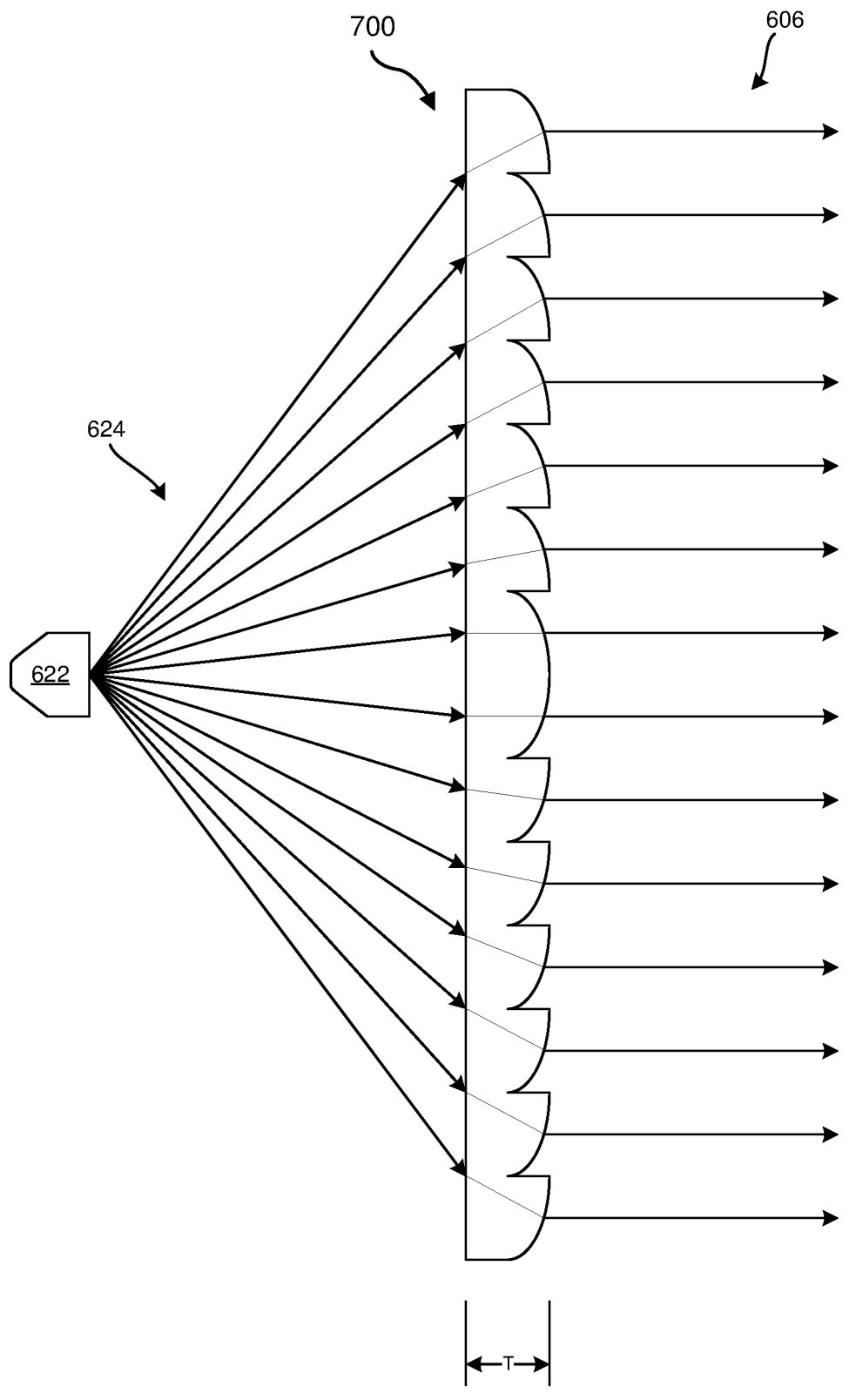
FIG. 8 is a side view of the Fresnel lens of FIG. 7, taken from line A-A in FIG. 7.
Figure 9:
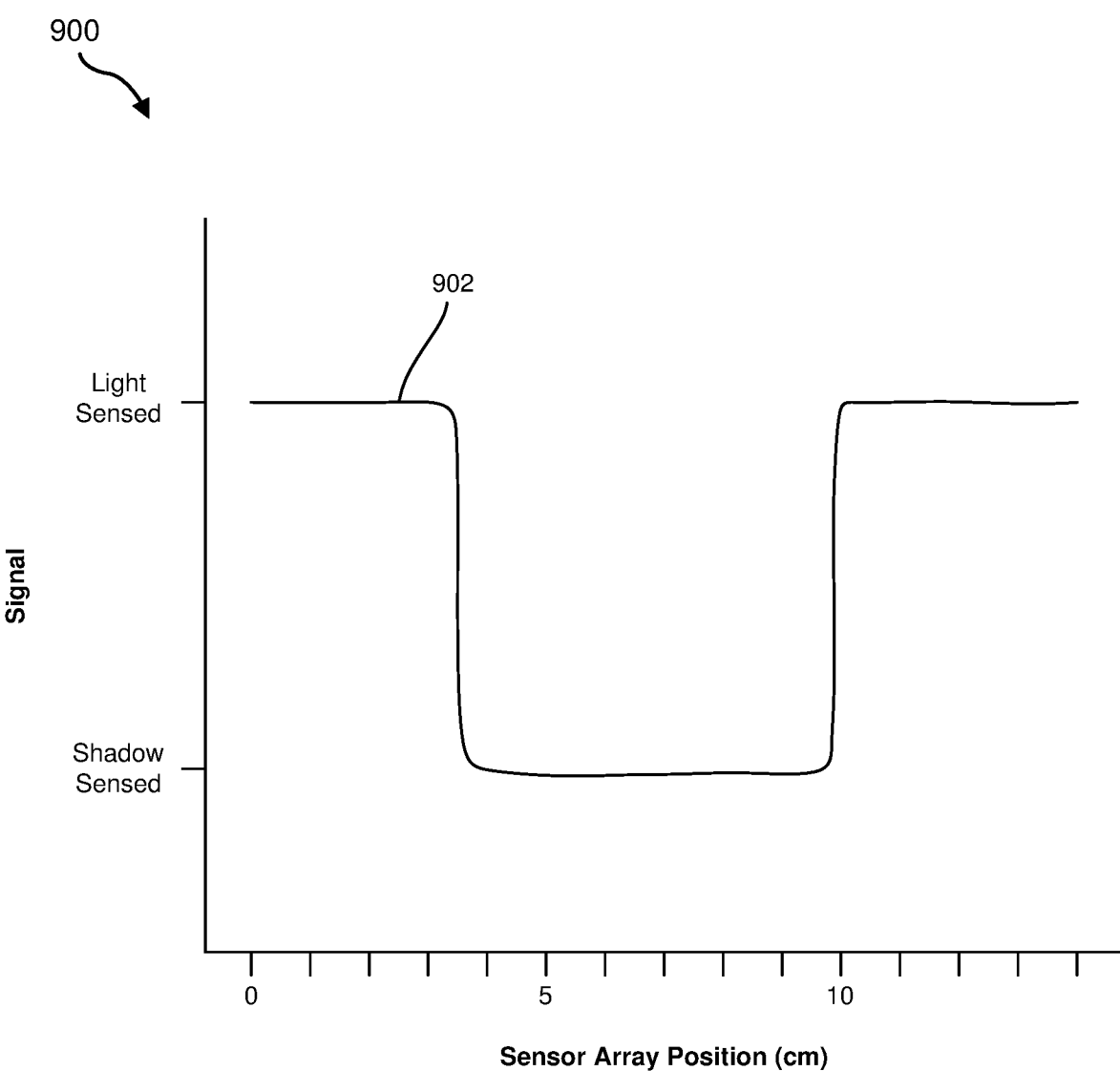
FIG. 9 is a plot illustrating a signal of an object-detection system, according to at least one embodiment of the present disclosure.

A brief description of an example operating environment in which various embodiments of systems and methods for installing a cable may operate is provided in connection with FIG. 1. Next, example robotic systems for deploying the cable on an overhead powerline are described with reference to FIGS. 2-5. Referring to FIGS. 6-8, object-sensing systems and components thereof are then described. With reference to FIG. 9, detailed descriptions are then provided of a plot illustrating a signal from such object-sensing systems. Detailed descriptions of an example method for fabricating object-sensing systems are then provided with reference to FIG. 10.

FIG. 1 is a graphical representation of an example operating environment 100 in which various embodiments disclosed herein may be utilized. As depicted in the example of FIG. 1, the operating environment 100 may include an electrical power transmission or distribution system having a plurality of utility poles 102 carrying multiple powerlines 101. Examples of powerlines 101 may include stranded cables, but the powerlines 101 are not restricted to such embodiments. While any number of powerlines 101 may be carried via the utility poles 102, two powerlines 101 are illustrated in FIG. 1 for visual simplicity. In some examples, the powerlines 101 are mechanically coupled to the utility poles 102 via insulators 104, although other types of components (e.g., taps, standoffs, etc.) may be employed in various embodiments. While specific reference is made herein to the utility poles 102, any type of utility pole, H-frame, lattice tower, or other type of pole or tower that carries or supports one or more powerlines 101 may be included and covered in various embodiments of the operating environment 100 discussed herein. Additionally, the powerlines 101 may include one or more phase conductors, ground wires, static wires, or other conductors supported by the utility poles 102, towers, or the like.

Also shown in FIG. 1 is a cable 112 (e.g., a fiber optic cable or another material to be helically wrapped about the powerline 101) aligned with, and mechanically coupled to, the powerline 101. In some embodiments, the cable 112 may be helically wrapped about the powerline 101, such as by way of a human-powered or electrically powered robotic device. However, other physical relationships between the powerline 101 and the cable 112 are also possible. While only one cable 112 is depicted in FIG. 1, multiple powerlines 101 employing the same utility poles 102 may each have a corresponding cable 112 or multiple cables 112 attached or otherwise coupled thereto.

As depicted in FIG. 1, the cable 112 may be secured to the powerline 101 via one or more cable clamps 106. In some examples where the cable 112 includes a fiber optic cable, the cable 112 may follow a powerline 101 associated with a particular phase of the power being transmitted, or the cable 112 may alternate between two or three different phases. Moreover, each cable 112 may carry one or more optical fibers for facilitating communication within and across the operating environment 100.

Additionally, FIG. 1 illustrates an optical fiber splice case 108 that, in some embodiments, splices together corresponding ends of optical fibers of the cable 112. For example, relatively long stretches (e.g., multiple-kilometer spans) of cable 112 that may be coupled to the powerline 101 may be mechanically coupled together, thermally fused together, or otherwise coupled in the optical fiber splice case 108, which may include optical couplers, amplifiers, and/or other components to facilitate transmission of optical data signals from one span of the cable 112 to the next.

Additionally, in some embodiments, the optical fiber splice case 108 may include wireless access points and other networking components (e.g., for communication with Internet of Things (IoT) devices, smart grid sensors (e.g., voltage sensors, current sensors, and the like), and user access networks). Moreover, the optical fiber splice case 108 may include optical, electromagnetic, and other types of sensors to measure powerline conditions; environmental sensors for measuring temperature, humidity, and so on; video cameras for surveillance; and the like. To power such components, the optical fiber splice case 108 may also include solar cells and/or batteries. In some examples, such as that shown in FIG. 1, the optical fiber splice case 108 may be attached to, or positioned on or near, the powerline 101, as opposed to being mounted on a lower portion of the utility pole 102, thus potentially eliminating the use of a phase-to-ground transition that otherwise may be coupled with each length of the cable 112 to provide electrical isolation from the powerline 101.

Figure 2:
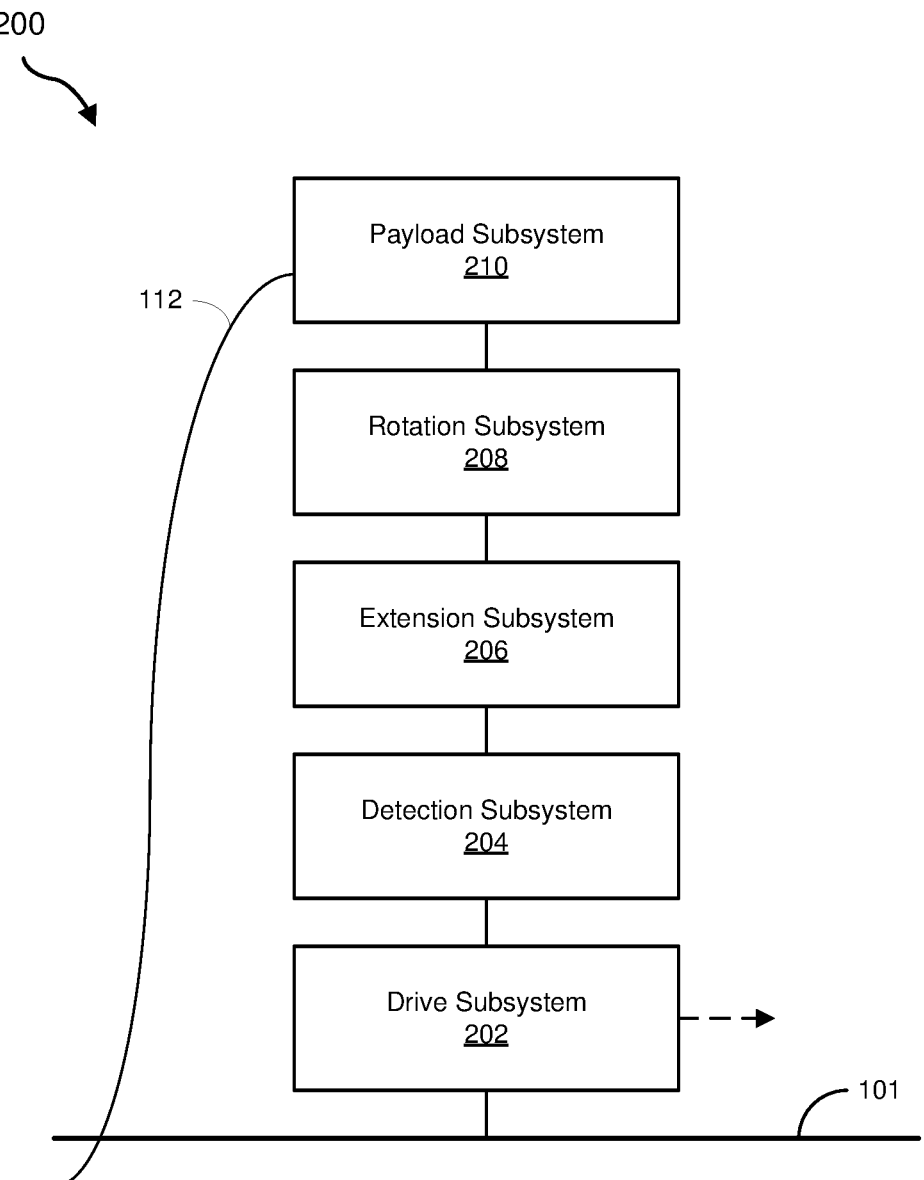
FIG. 2 is a block diagram of an example robotic system for installing cable along a powerline, according to at least one embodiment of the present disclosure.

FIG. 2 is a block diagram of an example robotic system 200 for installing cable (e.g., the cable 112, such as a fiber optic cable or another material) along an overhead powerline (e.g., the powerline 101). As depicted in FIG. 2, the robotic system 200 may include a drive subsystem 202, a detection subsystem 204, an extension subsystem 206, a rotation subsystem 208, and/or a payload subsystem 210. In some embodiments, FIG. 2 provides a general representation of how these subsystems 202-210 are mechanically coupled to each other, although other examples may possess alternative connection arrangements.

In some embodiments, the drive subsystem 202 may translate the robotic system 200 along the powerline 101. Also, in some examples, the extension subsystem 206 may mechanically couple the rotation subsystem 208 to the drive subsystem 202 and selectively extend the rotation subsystem 208, along with the payload subsystem 210, away from the drive subsystem 202 and/or the powerline 101 to avoid obstacles (e.g., insulators 104) along the powerline 101. The rotation subsystem 208, in some examples, may rotate the payload subsystem 210, which may in turn carry a segment of the cable 112, about the powerline 101 while the drive subsystem 202 translates along the powerline 101 such that the segment of the cable 112 is helically wrapped about the powerline 101.

The detection subsystem 204 may be configured to detect obstacles (e.g., insulator supports, tap clamps, splices, dampers, support poles, bird diverters, Stockbridge dampers, spiral vibration dampers, tie wraps, splices, and the like) along the powerline 101 that the robotic system 200 should avoid. The detection subsystem 204 may include detection components, such as one or more light detectors (e.g., stereoscopic cameras, two-dimensional (2D) cameras, infrared cameras, etc.), one or more light emitters (e.g., visible light emitters, infrared light emitters, laser light emitters, etc.), one or more sound (e.g., Sonar, ultrasonic, etc.) detectors, one or more sound (e.g., Sonar, ultrasonic, etc.) emitters, one or more LiDAR emitters and/or detectors, one or more Radar emitters and/or detectors, at least one processor for analyzing data from the other detection components, etc. These detection components may be positioned and oriented to obtain data representative of the powerline and/or obstacles along the powerline, including position data, size data, and/or shape data, etc.

In some embodiments, the detection subsystem 204 may be configured to sense and determine the obstacle type and position to facilitate avoidance of the obstacle. For example, a processor of the detection subsystem 204 may be programmed to determine the obstacle type (e.g., whether the obstacle is an insulator support, tap clamp, splice, damper, support pole, bird diverter, Stockbridge damper, spiral vibration damper, tie wrap, or splice), an obstacle position (e.g., below the powerline, above the powerline, to the side of the powerline, wrapped around the powerline, etc.), and/or an obstacle size to determine the appropriate obstacle avoidance maneuver and whether an obstacle avoidance maneuver is necessary. To this end, the detection subsystem 204 may be programmed with information about different expected obstacle types, sizes, and positions and may use computer vision recognition to identify such information about the obstacles.

The robotic system 200 may include one or more stabilization components (e.g., one or more thrusters, gyroscopes, inertial measurement units (IMUs), controllers, processors, or the like) that may help attain or maintain a desired position of the robotic system 200 relative to the powerline 101. The desired position may be directly above the powerline 101 (e.g., with a center of gravity of the robotic system 200 directly above the powerline 101). Further, in some examples, the stabilization components may be employed at least during times when the extension subsystem 206 is extending the rotation subsystem 208 (and, consequently, the payload subsystem 210) away from (e.g., vertically above) the powerline 101, such as to avoid an obstacle.

Figure 3:
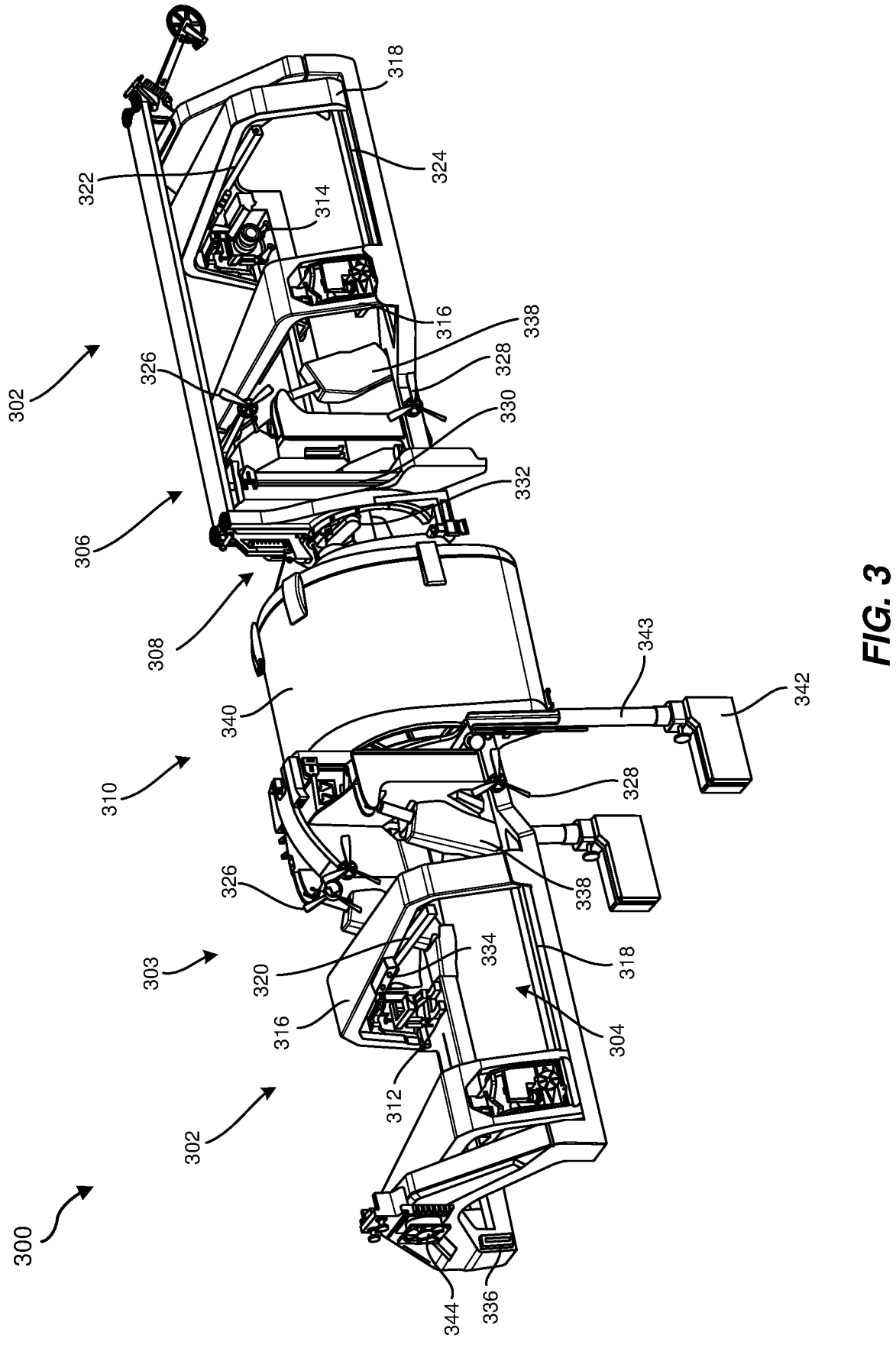
FIG. 3 is a perspective view of an example robotic system for installing cable along a powerline, according to at least one embodiment of the present disclosure.

FIG. 3 is a perspective view of an example robotic system 300 for installing a cable along a powerline. The robotic system 300 may include a drive subsystem 302, a stabilization subsystem 303, an obstacle detection subsystem 304, an extension subsystem 306, a rotation subsystem 308, and a payload subsystem 310.

The drive subsystem 302 may be configured to drive the robotic system 300 along a powerline (e.g., the powerline 101) as the rotation subsystem 308 rotates the payload subsystem 310 to deploy a cable (e.g., cable 112) along and around the powerline. The drive subsystem 302 may be implemented in a variety of ways. For example, the drive subsystem 302 may include one or more rollers, grippers, actuators, conveyers, pulleys, etc., that may be arranged and operated to move the robotic system 300 along the powerline. In the example shown in FIG. 3, the drive subsystem 302 may include grippers 312 and rollers 314 that are configured to clamp onto the powerline and to drive the robotic system 300 along the powerline. The rollers 314 may be powered and/or unpowered. The grippers 312 may be mounted on a gripper frame element 316, and the rollers 314 may be mounted on a roller frame element 318.

The grippers 312 may be laterally (e.g., perpendicular to the powerline) movable along a gripper rail 320 affixed to the gripper frame element 316. The rollers 314 may be laterally movable along a roller rail 322 affixed to the roller frame element 318. The roller frame element 318, and consequently the roller rail 322 and the rollers 314, may be axially (e.g., parallel to the powerline) movable along a frame rail 322 relative to other portions of the robotic system 300. The drive subsystem 302 may include one or more grippers 312 and/or rollers 314 in a first end portion (e.g., to the left in the perspective of FIG. 3) of the robotic system 300 and one or more grippers 312 and/or rollers 314 in a second, opposite end portion (e.g., to the right in the perspective of FIG. 3) of the robotic system 300.

During operation, the grippers 312 may grip the powerline to stabilize the robotic system, such as during an obstacle avoidance maneuver. To engage with the powerline, the grippers 312 may be moved from a retracted (e.g., outward) position inward toward the powerline along the gripper rail 320. To drive the robotic system 300 along the powerline, at least one of the rollers 314 may be engaged with the powerline and may be caused to rotate. The rollers 314 may be translated axially along the frame rail 324 during an obstacle avoidance maneuver to keep the rollers 314 in contact with the powerline for stability, as will be explained further below with reference to FIGS. 6-9. The rollers 314 may also be disengaged and moved laterally outward to avoid obstacles. After the obstacle is passed by the rollers 314, the rollers 314 may then be moved back into position to engage with the powerline for continued driving of the robotic system 300 along the powerline.

The stabilization subsystem 303 may be configured to stabilize the robotic system 300 along the powerline as the robotic system 300 is driven along the powerline and/or during an obstacle avoidance maneuver. The stabilization subsystem 303 may be implemented in a variety of ways. For example, the stabilization subsystem 303 may include upper actuators 326 (e.g., thruster, fans, gyroscopes, etc.) that are positioned to be above the powerline, at least during certain obstacle avoidance maneuvers. As shown in FIG. 3, the stabilization subsystem 303 may include four upper actuators 326, although other embodiments may include a different number of upper actuators 326. The upper actuators 326 may be configured to force air laterally away from the robotic system 300, resulting in an opposing force against a frame of the robotic system 300. The upper actuators 326 may be configured to be selectively driven (e.g., activated, deactivated, driven at different speeds, etc.) to stabilize a rolling of the robotic system 300, such as about the powerline.

The robotic system 300 may, at least during some operations (e.g., during an obstacle avoidance maneuver), have a center of gravity that is vertically above the powerline. This may cause the robotic system 300 to be unstable when the robotic system 300 is supported by the powerline. For example, if the center of gravity of the robotic system 300 deviates to a side (e.g., due to wind or operational movements) and the center of gravity is not directly above the powerline, the robotic system 300 may tend to roll about the powerline. The stabilization subsystem 303 may be configured to counteract such rolling instabilities.

The upper actuators 326 may be positioned away from the powerline to be able to apply a rotational force to the robotic system 300. For example, the upper actuators 326 may be above the center of gravity of the robotic system 300 during an obstacle avoidance maneuver. Thus, as the center of gravity moves out of alignment with the powerline and the robotic system 300 begins to roll, the upper actuators 326 may be driven to force air in the direction of the rolling motion to force the robotic system back into a stable position with the center of gravity directly above the powerline. In some examples, at least some of the upper actuators 326 may be mounted to a portion of the frame that may be extended (e.g., raised) by the extension subsystem 308. Thus, as the extension subsystem 308 is activated to raise a portion of the robotic system 300 (e.g., the payload subsystem 310), such as to avoid an obstacle, at least some of the upper actuators 326 may also be raised. This may enable the upper actuators 326 to apply a greater torque to the robotic system 300 corresponding to a greater instability that may occur when a center of gravity of the robotic system 300 is increasingly higher than the powerline. In additional examples, at least some of the upper actuators 326 may be positioned on the frame to be above the powerline but may be mounted to a fixed section of the frame (e.g., a portion of the frame that is not raised by the extension subsystem 308).

The upper actuators 326 may also be configured to roll the robotic system 300 about the powerline to reposition the robotic system 300 relative to the powerline. For example, during normal operation in which a cable is deployed along the powerline, the robotic system 300 may be inverted compared to the orientation shown in FIG. 3 to translate along the powerline in a stable position (e.g., with a center of gravity below the powerline). When an obstacle to be avoided, such as an insulator supporting the powerline from below, is detected along a bottom of the powerline, the upper actuators 326 may be operated to rotate the robotic system 300 about the powerline to attain the orientation shown in FIG. 3. In this orientation, the center of gravity of the robotic system 300 may be above the powerline and may therefore be in an unstable position. The upper actuators 326 may be operated to maintain the robotic system 300 in this unstable position throughout an obstacle avoidance maneuver.

In some embodiments, the stabilization subsystem 303 may also include lower actuators 328 (e.g., thrusters, fans, gyroscopes, etc.). The lower actuators 328 may be positioned on the frame of the robotic system 300 to be closer to the powerline than the upper actuators 326. The lower actuators 328 may be positioned and configured to be selectively driven to stabilize a sway of the robotic system 300. For example, due to the flexibility of the powerline, the robotic system 300 and the powerline may tend to laterally sway, such as in response to wind or operational movements of the robotic system 300. The lower actuators 328 may be configured to counteract the swaying by forcing air in a direction of the sway, resulting in a force that pushes back against the swaying motion.

As noted above, the robotic system 300 may be normally operated in an inverted orientation compared to the orientation shown in FIG. 3. In some examples, the lower actuators 328 may also be actuated to assist in rotating the robotic system 300 about the powerline to position the robotic system 300 in the pose (e.g., orientation) shown in FIG. 3.

The obstacle detection subsystem 304 may be configured to detect obstacles that the robotic system 300 may encounter as the robotic system 300 is driven along the powerline by the drive subsystem 302. The obstacle detection subsystem 304 may be implemented in a variety of ways. For example, the obstacle detection subsystem 304 may include at least one light detector (e.g., a stereoscopic camera, a 2D camera, an infrared camera, a combination thereof, etc.), an ultrasound emitter and receiver, or the like. In the example shown in FIG. 3, the detection subsystem 304 includes a stereoscopic infrared camera 334 and a shadow sensor 336 positioned on a frame of the robotic system 300 at an end portion (e.g., a front end portion) thereof.

The stereoscopic infrared camera 334 may include an infrared emitter and two distinct infrared image capture devices. The infrared capture devices may be configured to capture two perspectives of infrared light emitted by the infrared emitter and reflected from obstacles along the powerline, such as to facilitate determining a distance to the obstacles.

As will be explained further below, the shadow sensor 336 may include an emitter configured to emit a collimated linear beam of light (e.g., laser light) at a predetermined wavelength. The shadow sensor 336 may also include a linear array (e.g., 1-5 pixels wide and several hundred pixels long) of light sensors configured to sense the linear beam of light and to detect shadows (e.g., a lack of a signal at the predetermined wavelength). The shadow sensor 336 may be capable of detecting shadows to determine the position of an obstacle passing through the collimated linear beam of light at a resolution of 1 mm or better, such as about 1 mm or about 0.5 mm.

Data from both of the stereoscopic infrared camera 334 and the shadow sensor 336 may be analyzed by at least one processor to determine the location of obstacles along the powerline at various times. For example, the stereoscopic infrared camera 334 may be used to determine a distance of an obstacle from the stereoscopic infrared camera 334 and the shadow sensor 336 may be used to verify the distance and/or to determine the distance as the obstacle moves out of a field of view of the stereoscopic infrared camera 334. In some embodiments, the processor may also be configured to analyze data from the infrared camera 334 and shadow sensor 336 to identify the location of the powerline.

The stereoscopic infrared camera 334 and the shadow sensor 336 may be positioned at a variety of locations on the robotic system 300. An appropriate location may be selected to enable the infrared camera 334 and the shadow sensor 336 to have a field of view that covers expected positions of obstacles along the powerline. By way of example and not limitation, the infrared camera 334 and shadow sensor 336 may be positioned on a frame of the robotic system 300. For example, the stereoscopic infrared camera 334 and/or the shadow sensor 336 may be mounted on the gripper frame element 316, on the roller frame element 318, and/or on another location on the frame of the robotic system 300. As shown in FIG. 3, in some examples the stereoscopic infrared camera 334 may be positioned centrally on the gripper frame element 316 above the powerline to capture images of the powerline along its axis. The shadow sensor 336 may be positioned on the frame to optically sense a position of the powerline from a lateral side of the powerline and adjacent to grippers and/or rollers.

In some embodiments, the drive subsystem 302 may include a motion subsystem configured to sense a distance that the robotic system 300 is driven along the powerline by the drive subsystem 302. An obstacle's location may be known by the obstacle detection subsystem 304 at one time, but the obstacle may go out of the field of view of the obstacle detection subsystem 304 (e.g., of the infrared camera 334 and/or of the shadow sensor 336) as the robotic system 300 moves along the powerline. For example, the obstacle may be obscured by a component of the robotic system 300 or may otherwise not be directly trackable. By sensing a distance that the robotic system 300 has travelled along the powerline after the location of the obstacle is last known, a distance between the obstacle and a component of the robotic system 300 may be estimated, even if the obstacle is not in view during the travel. For example, an encoder may determine how far along the powerline the robotic system 300 has traveled, such as by determining rotations of a roller and/or of another drive actuator. In additional examples, the position and movement of the robotic system 300 along the powerline may be determined in other ways, such as by using information from an IMU, from a global positioning system (GPS) receiver, from a simultaneous localization and mapping (SLAM) system, etc. Data from one or more shadow sensors 336 can serve to verify and/or correct the predicted location of objects as the robotic system 300 moves along the powerline.

The extension subsystem 306 may be configured to move at least the payload subsystem 310 to avoid obstacles. The extension subsystem 306 may be implemented in a variety of ways. For example, the extension subsystem 306 may include extension rails 330 along which the payload 310 may be extended (e.g., raised or lowered, depending on the pose of the robotic system 300). An extension actuator 332 (e.g., a servo motor, a piston, etc.) may be used to extend the payload subsystem 310 along the extension rails 330.

In some embodiments, end portions of the robotic system 300 may be rotatable downward to facilitate obstacle avoidance. The extension subsystem 306 may also include end rotation actuators 338 (e.g., linear actuators, servo motors, rotational motors, etc.) configured to rotate the end portions of the robotic system 300 downward.

The rotation subsystem 308 may be configured to rotate the payload subsystem 310 to enable the payload subsystem 310 to wrap cable around the powerline as the robotic system 300 progresses along the powerline. The rotation subsystem 308 may be implemented in a variety of ways. For example, the rotation subsystem 308 may include a rotation actuator (e.g., a motor, a gear, pulleys, belts, etc.) that is operatively coupled to the payload subsystem 310.

The payload subsystem 310 may be configured to house cable (e.g., fiber optic cable or another material) for deployment along the powerline. The payload subsystem 310 may be implemented in a variety of ways. For example, the payload subsystem 310 may include a spool of cable within a payload housing 340. In some embodiments, the payload housing 340 may generally have a U-shape, with a lower opening that can be positioned to extend around the powerline.

While operating in a cable deployment mode, the robotic system 300 may be moved along a powerline by the drive subsystem 302. Simultaneously, the rotation subsystem 308 may rotate the payload subsystem 310. The cable within the payload subsystem 310 may be deployed from the payload subsystem 310 and wrapped around the powerline. During operation in the cable deployment mode, the stabilization subsystem 303 may maintain the robotic system 300 in a desired orientation.

The obstacle detection subsystem 304 may be used to identify a location of an obstacle along the powerline and a size of the obstacle to determine when to perform an obstacle avoidance maneuver. While operating in an obstacle avoidance mode, the rotation subsystem 308 may stop rotating the payload subsystem 310 and the extension subsystem 306 may lift the payload subsystem 310 high enough to avoid contacting the obstacle. The stabilization subsystem 303 may be used to maintain the robotic system in a desired (e.g., upright) orientation, such as during the obstacle avoidance maneuver. The drive subsystem 302 may be used to move the robotic system 300 past the obstacle, after which the extension subsystem 306 may lower the payload system 310 back into its initial position to deploy cable. The rotation subsystem 308 may resume rotating the payload subsystem 310 about the powerline and the drive subsystem 302 may continue to drive the robotic system along the powerline.

The robotic system 300 may also include additional features and elements. For example, a power source (e.g., one or more batteries 342) may be included to provide power to the other subsystems to enable the robotic system 300 to operate. In some examples, as illustrated in FIG. 3, the batteries 342 may be positioned on battery rails 343 that extend downward (in the orientation shown in FIG. 3), such that the batteries 342 are below the powerline during at least some operations (e.g., during an obstacle avoidance maneuver). This configuration may improve a stability of the robotic system by lowering a center of gravity of the robotic system 300. In addition, the robotic system 300 may include one or more control elements, such as processors, controllers, communication interfaces (e.g., for wireless and/or wired communication), memory, etc.

In some examples, the robotic system 300 may include at least one controller 344 configured to control the actuators 326, 328 of the stabilization subsystem 303. For example, the controller(s) 344 may include at least one proportionalintegral-derivative (PID) controller 344 operatively coupled to the actuators 326, 328 to operate the actuators 326, 328 at appropriate actuator speeds to maintain the robotic system 300 in a desired orientation (e.g., with a center of gravity laterally aligned with the powerline). The controllers 344 may receive feedback from one or more sensors, such as an inertial measurement unit (IMU) 346. The IMU 346 may include one or more accelerometers, gyroscopes, etc., which may be configured to sense an orientation of the robotic system 300. As the IMU 346 senses that the robotic system 300 rolls or sways, the controllers 344 may operate the actuators 326 and/or 328 to apply a force against a frame of the robotic system 300 to re-orient the robotic system 300 to a desired orientation.

Figure 4:
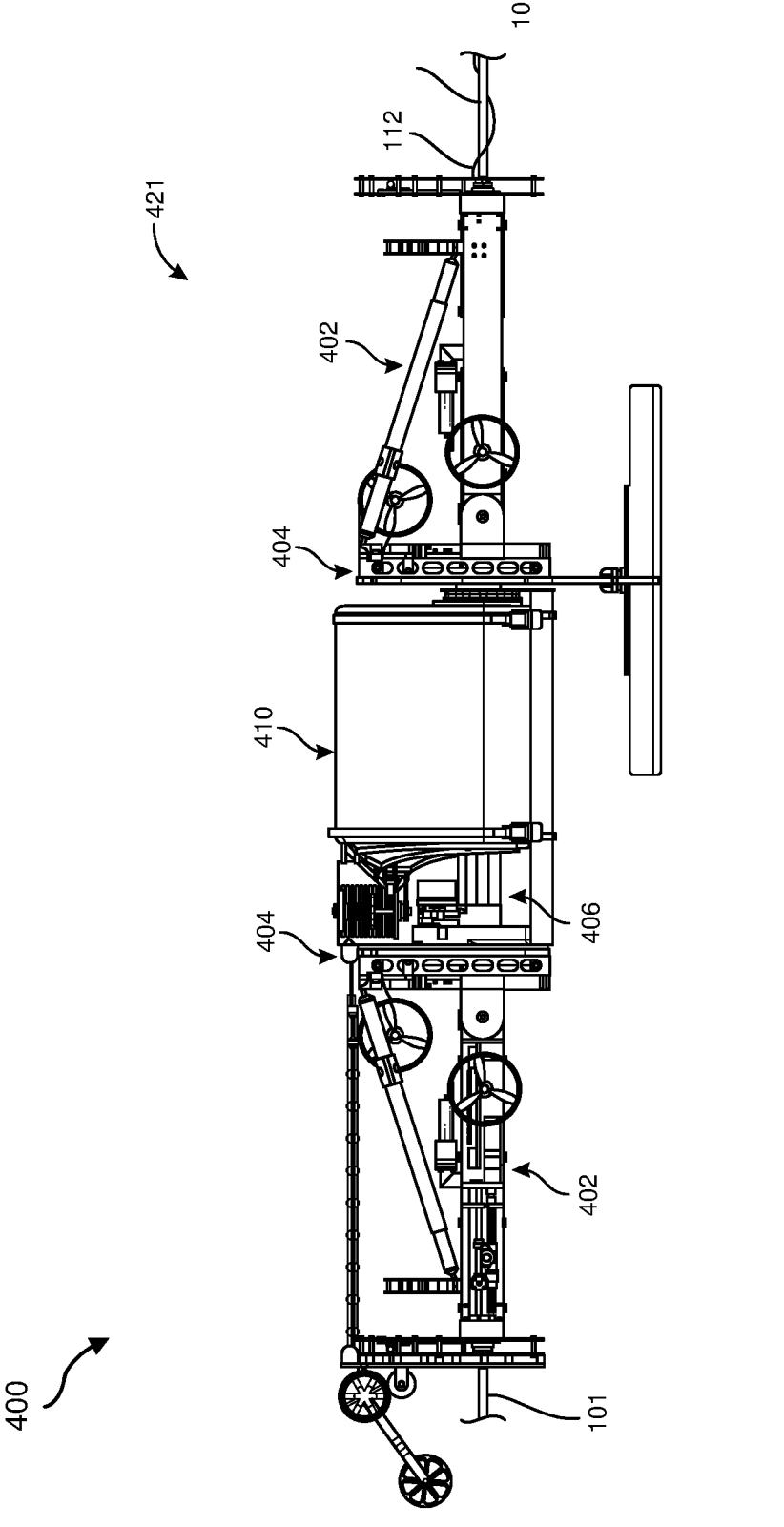
FIG. 4 is a side view of an example robotic system that may install a segment of cable about a powerline, where the robotic system is in a payload retracted configuration (e.g., a normal operating mode), according to at least one embodiment of the present disclosure.
Figure 5:
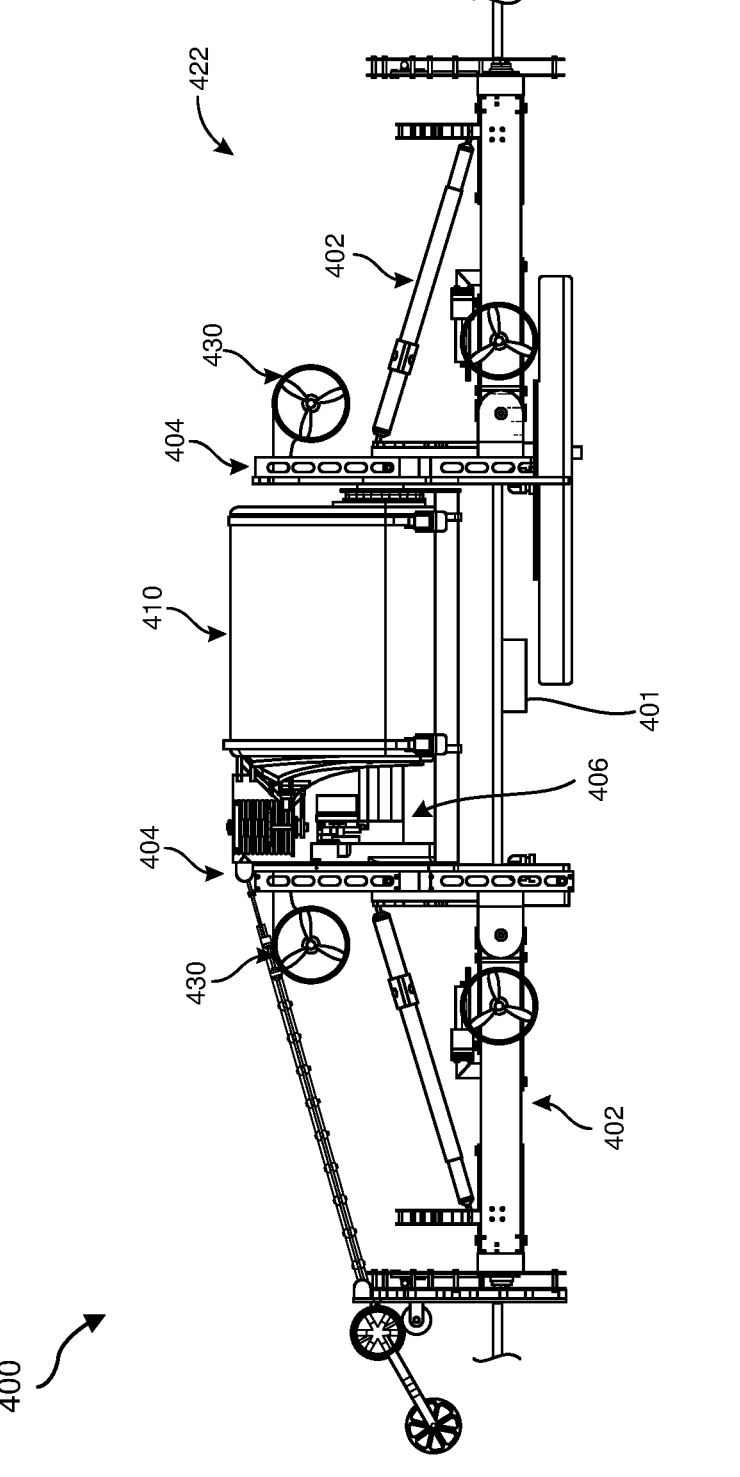
FIG. 5 is a side view of the robotic system of FIG. 4 with the payload subsystem in a payload extended configuration (e.g., an obstacle avoidance mode), according to at least one embodiment of the present disclosure.

FIGS. 4 and 5 are side views of associated configurations of an example robotic system 400, which may serve as an embodiment of the robotic system 200 of FIG. 2, as described above. As illustrated in FIGS. 4 and 5, the drive subsystem 202 may include separate drive subsystem end portions 402, and the extension subsystem 206 may include separate extension subsystem end portions 404 mechanically coupled to the corresponding drive subsystem end portions 402. In some embodiments, the robotic system 400 may include a first (e.g., leading or fore) end and a second (e.g., trailing or aft) end that may be determined by a direction in which the robotic system 400 translates along the powerline 101, with each end corresponding to a drive subsystem end portion 402 and an extension subsystem end portion 404. Additionally, a rotation subsystem 406 (e.g., serving as rotation subsystem 208 of FIG. 2), or some portion thereof, may be coupled at opposing ends to the extension subsystem end portions 404. Further, a payload subsystem 404 (e.g., serving as payload subsystem 210 of FIG. 2) carrying a segment of cable 112 may be connected to, and held within, the rotation subsystem 406.

During normal operation (e.g., while not in an obstacle-avoidance scenario), the robotic system 400 may be in a payload retracted configuration 421, as depicted in FIG. 4, in which both of the drive subsystem end portions 402 are in a retracted (non-extended) position, and in which at least one drive subsystem end portion 402 may propel the robotic system 400 along the powerline 101 while the rotation subsystem 406 may rotate the payload subsystem 410 about its longitudinal axis that substantially aligns with the powerline 101 and while the payload subsystem 410 pays out a segment of cable 112, resulting in the segment of the cable 112 being helically wrapped about the powerline 101. In addition, in some examples, the extension subsystem end portions 404 may retain the rotation subsystem 406 in a retracted state so that the rotation subsystem 406 and the payload subsystem 410 remain close to the powerline 101, thus increasing the physical stability of the system while installing the cable 112. In additional examples, a center of gravity of the robotic system 400 may be below the powerline 101 during normal operation, such as upside-down relative to the orientation shown in FIG. 4.

In some embodiments, each of the drive subsystem end portions 402 may be independently operated in a retracted state (e.g., as illustrated in FIG. 4) or an extended state (e.g., longitudinally along powerline 101 to facilitate obstacle avoidance by extending beyond an obstacle) and to selectively engage or release powerline 101 while bypassing an obstacle. Other examples may not include extendable or retractable versions of the drive subsystem end portions 402.

FIG. 5 is a side view of the robotic system 400 in a payload extended configuration 422 (e.g., an obstacle avoidance mode), in which the extension subsystem end portions

404 extend the payload subsystem 410 away (e.g., upward) from the drive subsystem end portions 402 and the powerline 101 as the drive subsystem end portions 402 translate the robotic system 400 along the powerline 101, thus allowing the rotation subsystem 406 (and, consequently, the payload subsystem 410) to pass over an obstacle 401. In addition, in some examples, the rotation subsystem 406 may include one or more stabilizing components (e.g., the upper actuators 430) to stabilize the orientation of the rotation subsystem 406, and thus the robotic system 400, such as by maintaining the current rotational position of the robotic system 400 relative to the powerline 101 (e.g., in the orientation illustrated in FIGS. 4 and 5). In some embodiments, the rotation subsystem 406 may provide stabilization only while the extension subsystem end portions 404 extend the rotation subsystem 406 upward or may provide such stabilization at other times as well.

In some embodiments, one or more components of the robotic system 400 that are primarily employed by the robotic system 400 for functions not directly associated with stabilization may be utilized to provide such stabilization. For example, components used for translation of the robotic system 400 along the powerline 101 (e.g., drive wheels and corresponding motors that clamp or otherwise engage the powerline 101 as part of the drive subsystem end portions 402) may be also configured to translate in a direction parallel to the ground and orthogonal to the powerline 101 relative to other portions of the robotic system 400, such as the extension subsystem end portions 404 and the rotation subsystem 406. In the payload extended configuration 422 and during an obstacle avoidance maneuver, the drive wheels may thus be located significantly below a center of gravity of the robotic system 400. Consequently, shifting the drive wheels horizontally in a direction toward which payload subsystem 410 begins to tilt may counteract the tilt, resulting in a stabilization force being applied to the robotic system 400 to maintain the robotic system 400 in an upright orientation.

To successfully balance the robotic system 400 at least while in the payload extended configuration 422, a control method may be employed that utilizes one or more mathematical models representing the robotic system 400 and powerline 101. For example, the robotic system 400 may be modeled as an inverted pendulum balancing on a vibrating string (e.g., representing the powerline 101), thus obeying the wave equation. In some embodiments, the mathematical model may be created by joining a finite element method (FEM) model of a vibrating string with a rigid-object model of an inverted pendulum on a cart on the string. In some examples, these models may be joined to form a unified model by algebraically eliminating a shared constraint force from separate equations of motion (EOM). Further, in some embodiments, the rigid-object model for the robotic system 400 may include a model for one or more actuators (e.g., the actuators 430, gyroscopes, or the like) that may impose force on the robotic system 400 to stabilize robotic system 400 (e.g., in an upright position over the powerline 101).

To facilitate obstacle avoidance, automatic detection and/or recognition of such obstacles may be employed. In some embodiments, as discussed above, the robotic system 400 may implement stereovision-based perception (e.g., using two or more cameras and/or other types of image sensors) and/or shadow-based perception to generate information regarding obstacles as the robotic system 400 travels along the powerline 101. Such information may include, but is not limited to, a distance to the obstacle, one or more dimensions of the obstacle, a spatial boundary of the obstacle, and/or an orientation of the obstacle relative to the robotic system 400. Further, in some examples, a control system of the robotic system 400 may determine and/or apply one or more obstacle avoidance strategies based on the generated information.

The robotic systems 200, 300, and 400 described above are example robotic systems that may employ object-detection systems of the present disclosure. However, the disclosed object-detection systems are not limited to use in such robotic systems. Any device or mechanism that may benefit from object detection with a system that is low-power and/or low-weight with sub-millimeter accuracy could implement aspects of the present disclosure. By way of example and not limitation, various systems that may use an object-detection system of the present disclosure include a powerline-crawling robot that inspects a powerline (e.g., for damage, buildup of organic matter, etc.).

In addition, the operating environment 100 of FIG. 1 is also provided as a non-limiting example. In other embodiments, robotic systems including an object-detection system of the present disclosure may be deployed on other types of overhead lines, such as transmission lines or overhead lines that do not carry electricity (e.g., support cables, etc.). Similarly, object-detection systems according to some examples of the present disclosure may be used to detect any objects that at least partially fit within a detection zone thereof, including objects other than lines or their surroundings.

FIG. 6 is a side view of an object-detection system 600, according to at least one embodiment of the present disclosure. The object-detection system 600 may include a light transmitter subsystem 602 and a light receiver subsystem 604. The light transmitter subsystem 602 may be positioned to be on a first side of a powerline 606 and the light receiver subsystem 604 may be positioned to be on a second, opposite side of the powerline 606. During some operations, an obstacle 607 may also be positioned between the light transmitter subsystem 602 and the light receiver subsystem 604, such as against the powerline 606 as shown in FIG. 6.

The light transmitter subsystem 602 may be configured to generate a collimated linear beam of light 608. The collimated linear beam of light 608 may have a predetermined wavelength, such as an infrared wavelength (e.g., a wavelength between about 700 nm and about 1 mm, such as about 904 nm). A length L of the collimated linear beam of light 608 may be at least 3 inches, such as 3 inches, 4 inches, 5 inches, 5.5 inches, 6 inches, or more.

In some examples, the light transmitter subsystem 602 may include a laser driver 612 configured for driving a laser light source 612 capable of emitting a beam of laser light at the predetermined wavelength. The beam of laser light may be transmitted, such as through a fiber optic cable 614, to a connector 616 (e.g., a so-called "FC/PC connector"), which may transmit the beam of laser light to a collimator 618. In additional examples, light from the laser light source 612 may be directly provided to the collimator 618 without the fiber optic cable 614 and/or connector 616. The collimator 618 may collimate the beam of laser light to form a collimated beam of light 620, which includes parallel light rays. The collimated beam of light 620 may then be directed to a Powell lens 622. The Powell lens 622 may convert the collimated beam of light 620 to a linear fan of light 624. The linear fan of light 624 formed by the Powell lens 622 may be characterized by a diverging fan of light with substantially uniform intensity along its length, as opposed to a gaussian intensity distribution that might otherwise be result from a fan of light formed by a cylindrical lens. The linear fan of light 624 may also have an expanding length (e.g., up and down along the page from the perspective of FIG. 6) and a relatively narrow width (e.g., into and out of the page from the perspective of FIG. 6), such as less than 3 mm.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 80% met, 90% met, at least about 95% met, at least about 99% met, or fully met.

A linear lens 626 may be positioned to receive the linear fan of light 624 from the Powell lens 622. The linear lens 626 may be configured to convert the linear fan of light 624 to the collimated linear beam of light 608. By way of example, the linear lens 626 may be a cylindrical lens and/or a Fresnel lens (e.g., a cylindrical Fresnel lens) that has a length of at least 3 inches (e.g., 3 inches, 4 inches, 5 inches, 5.5 inches, 6 inches, etc.) and a narrow width (e.g., 5 mm or less, such as 3 mm, 2 mm, 1.5 mm, or 1 mm) (e.g., into and out of the page from the perspective of FIG. 6) relative to its length. In some embodiments, the linear lens 626 may also have a small thickness (e.g., 5 mm or less, such as 3 mm, 2 mm, 1.5 mm, or 1 mm) (e.g., left and right from the perspective of FIG. 6) relative to its length. The collimated linear beam of light 608 may exit the linear lens 626 and ultimately the light transmitter subsystem 602 and may be directed across a space including the powerline 606. In some examples, the linear lens 626 may be positioned such that its focal point is at the Powel lens 622.

Optionally, one or more plane mirrors 628 (illustrated in dashed lines in FIG. 6) may be positioned to physically shorten the light transmitter subsystem 602. For example, a plane mirror 628 or mirror stack may be positioned between the collimator 618 and the Powell lens 622 to shorten a distance between the collimator 618 and the Powell lens 622. Alternatively or additionally, a plane mirror 628 or mirror stack may be positioned between the Powell lens 622 and the linear lens 626 to shorten a distance between the Powell lens 622 and the linear lens 626.

The light receiver subsystem 604 may include a linear sensor array 630 positioned to receive the collimated linear beam of light 608 or a portion thereof from the light transmitter subsystem 602 (e.g., from the linear lens 626). By way of example, the linear sensor array 630 may include complementary metal-oxide semiconductor (CMOS) image sensor pixels arranged in a linear fashion.

The linear sensor array 630 may have a small lateral width, such as one to five sensor pixels (e.g., one sensor pixel, two sensor pixels, three sensor pixels, four sensor pixels, or five sensor pixels). In some embodiments, the linear sensor array 630 may have a lateral width of only one sensor pixel.

A length of the linear sensor array 630 (e.g., up and down from the perspective of FIG. 6) may correspond to the length of the linear lens 626 and/or to the length of the collimated linear beam of light 608. For example, the linear sensor array 630 may have a length of at least 3 inches, such as 3 inches, 4 inches, 5 inches, 5.5 inches, 6 inches, or more. In some examples, the linear sensor array 630 may have a resolution of at least 200 pixels per inch in length, such as 250 pixels per inch, 300 pixels per inch, or greater. Thus, the linear sensor array 630 may have several hundred (e.g., 600-1,800 or more) pixels along its length. This resolution may enable object sensing and locating with sub-millimeter accuracy.

A band pass filter 632 may be positioned over the linear sensor array 630. The band pass filter 632 may be configured to allow passage of light having the wavelength of the collimated linear beam of light 608 but may block other wavelengths of light. This may reduce noise and/or stray light that would otherwise reach the linear sensor array 630. Additionally and/or alternatively, a louver film 634 may be positioned over the linear sensor array 630. The louver film 634 may be configured to allow passage of light at an angle of the collimated linear beam of light 608 but may reduce and/or eliminate the passage of light at other angles. Thus, the louver film 634 may also reduce noise and/or stray light that would otherwise reach the linear sensor array 630, regardless of its wavelength.

The light receiver subsystem 604 may also include a signal processor 636 operatively coupled to the linear sensor array 630. The signal processor 636 may process a signal from the linear sensor array 630 to determine a position of the powerline 606 and/or any obstacle 607 between the light transmitter subsystem 602 and the light receiver subsystem 604. The signal processor 636 may be programmed with a signal processing algorithm to accomplish this determination based on the signal from the linear sensor array 630.

For example, the linear sensor array 630 may be illuminated by light from the light transmitter subsystem 602 in a first illuminated region 638 (e.g., above the powerline 606 and obstacle 607) and in a second illuminated region 640 (e.g., below the powerline 606 and obstacle 607). The linear sensor array 630 may not be illuminated in a shadowed region 642 where the collimated linear beam of light 608 from the light transmitter subsystem 602 is blocked by the powerline 606 and/or obstacle 607). In the first and second illuminated regions 638, 640, pixels of the linear sensor array 630 may be illuminated by the collimated linear beam of light 608 and may return a signal indicating that there is no obstruction between the light transmitter subsystem 602 and the light receiver subsystem 604 along the first and second illuminated regions 638, 640. In the shadowed region 642, pixels of the linear sensor array 630 may not be illuminated by the collimated linear beam of light 608 and may return a signal indicating that there is an obstruction between the light transmitter subsystem 602 and the light receiver subsystem 604 along the shadowed region 642. Thus, the object-sensing system 600 may be referred to as a "shadow-based" object sensing system 600.

In some embodiments, the signal processor 636 may be programmed to identify the powerline 606 as an object that is always or usually present between the light transmitter subsystem 602 and the light receiver subsystem 604 during normal operation, although the powerline 606 may move (e.g., up and down from the perspective of FIG. 6) relative to the object-sensing system 600. For example, the signal processor 636 may be programmed with an expected width of the powerline 606 and may recognize that a shadow of the same or a similar width is likely the powerline 606. However, as the shadowed region 642 increases in size past a predetermined threshold (e.g., 5 mm larger, 10 mm larger, etc.) relative to the expected width of the powerline 606, the signal processor 636 may indicate that an obstacle 607 is present in addition to the powerline 606.

The small lateral width of the linear sensor array 630, compared to a sensor array with a larger lateral width and/or compared to a single pixel sensor, may reduce computing power required to determine where light is detected and where a shadow from an obstacle is detected. A complexity of the optical system may also be reduced, such as by reducing or eliminating moving parts (e.g., spinning mirrors and/or lenses). In addition, the incident light from the light transmitter subsystem 602 may be generated with relatively low electrical power, since only a narrow line of light (e.g., the collimated linear beam of light 608) is needed to illuminate the linear sensor array 630 and to detect a position of objects (e.g., the powerline 606, the obstacle 607, etc.) between the light transmitter subsystem 602 and the light receiver subsystem 604. The reduction in computing power, electrical power, and complexity may result in a size (e.g., mass) reduction of the object-sensing system 600 compared to other configurations that might be capable of sensing objects. By way of example, the object sensing system 600, including the light transmitter subsystem 602 and the light receiver subsystem 604 capable of sensing objects within a space having a height of 3-6 inches, may have a mass of less than 400 grams, such as 350 grams, 300 grams, 250 grams, or 200 grams. Physical dimensions of the object-sensing system 600 may also be reduced compared to other configurations. Thus, the object-sensing system 600 may be suitable for inclusion in a powerline-crawling, fiber-deploying robotic system (e.g., any of the systems 200, 300, 400 described above) or in another system that has weight and/or size constraints.

FIG. 7 is a front view of a Fresnel lens 700 that may be employed in the object-sensing system 600 of FIG. 6, according to at least one embodiment of the present disclosure. The Fresnel lens 700 may be employed as the linear lens 626 of the object-sensing system 600. As noted above, the Fresnel lens 700 may be substantially longer than it is wide. By way of example and not limitation, the Fresnel lens 700 may have a length L of at least 3 inches and a width of 5 mm or less. The view of FIG. 7 is not necessarily proportional nor to scale.

FIG. 8 is a side view of the Fresnel lens 700 of FIG. 7, taken from line A-A of FIG. 7. As illustrated in FIG. 8, the Fresnel lens 700 may receive the linear fan of light 624 from the Powell lens 622 and may redirect the light to form the collimated linear beam of light 608. A thickness T of the Fresnel lens 700 may, in some examples, be less than 5 mm, such as 3 mm, 2 mm, 1.5 mm, or 1 mm. The view of FIG. 7 is not necessarily proportional nor to scale. As noted above, the collimated linear beam of light 608 may have a substantially constant intensity across its length. In some embodiments, the Fresnel lens 700 may be a cylindrical Fresnel lens 700, which may include facets that correspond to a shape of a cylindrical lens of the same length L (FIG. 7) as the Fresnel lens 700.

FIG. 9 is a plot 900 illustrating a signal 902 of an object-sensing system, according to at least one embodiment of the present disclosure. The signal 902 may correspond to an output of a linear sensor array of the object-sensing system, such as the linear sensor array 630 of the object-sensing system 600 of FIG. 6. The vertical axis of the plot 900 represents a level of the signal 902, and the horizontal axis of the plot 900 represents a length of the linear sensor array 630. In this example, the linear sensor array 630 may have a length of about 14 cm, which corresponds to about 5.5 inches.

In parts of the linear sensor array 630 where light having the predetermined wavelength of a collimated linear beam of light is sensed, a high signal representing that the light is sensed may result. This illuminated portion of the plot 900 may correspond to areas where no obstruction is present that would otherwise block the collimated linear beam of light.

In parts of the linear sensor array 630 where no such light is sensed, or a low level of such light is sensed (e.g., from ambient noise and/or reflections), a low signal representing a shadow may result. This shadowed (e.g., not illuminated) portion of the plot 900 may correspond to areas where an obstruction is present that substantially blocks the collimated linear beam of light.

A position of edges of the obstruction may be identified where the signal 902 drops from a high signal (e.g., light sensed) to a low signal (e.g., shadow sensed). As noted above, the linear sensor array 630 may have a resolution (e.g., 200 pixels per inch, 300 pixels per inch, etc.) sufficient to identify the position of edges of the obstruction with sub-millimeter accuracy. A sub-millimeter accuracy may be enough to identify obstructions and operate a robotic system 200, 300, 400 in the manner described above.

FIG. 10 is a flow diagram of a method 1000 of fabricating an object-sensing system, according to at least one embodiment of the present disclosure. At operation 1010, a collimator may be operatively coupled to a laser light source. For example, the collimator may be coupled to the laser light source with a fiber optic cable connected to an FC/PC connector. The collimator may be configured to form a collimated beam of light from laser light originating at the laser light source. The laser light may have a predetermined wavelength, such as an infrared wavelength (e.g., 904 nm).

At operation 1020, a Powell lens may be positioned to receive the collimated beam of light and to form a linear fan of light from the collimated beam of light. The linear fan of light may diverge from the Powell lens.

At operation 1030, a linear lens may be positioned to receive the linear fan of light and to form a collimated linear beam of light from the linear fan of light. For example, the Powell lens may be positioned at a focal point of the linear lens (e.g., a Fresnel lens and/or a cylindrical lens). The collimated linear beam of light formed by the linear lens may have a length of at least 3 inches (e.g., 4 inches, 5 inches, 5.5 inches, 6 inches, etc.). An intensity distribution of the collimated linear beam of light may be substantially constant across a length of the collimated linear beam of light.

At operation 1040, a linear sensor array (e.g., a CMOS sensor array) may be positioned to receive the collimated linear beam of light and to detect shadows caused by objects between the linear lens and the linear sensor array. The objects may block at least a portion of the collimated linear beam of light, resulting in the shadows. The linear sensor array may have a length of at least 3 inches (e.g., 4 inches, 5 inches, 5.5 inches, 6 inches, etc.) and a width of 1-5 pixels (e.g., 1 pixel, 3 pixels, etc.).

In some examples, a band pass filter may be positioned over the linear sensor array to allow light of the predetermined wavelength to pass but to block light having other wavelengths. Additionally or alternatively, a louver film may be positioned over the linear sensor array to allow light at an angle of the collimated linear beam of light to pass but to block light at other angles. The band pass filter and/or louver film may inhibit stray light from reaching the linear sensor array, thereby reducing noise in a signal generated by the linear sensor array.

In addition, a signal processor may be operatively coupled to the linear sensor array and may be configured to process a signal from the linear sensor array to determine a location of objects between the linear lens and the linear sensor array. The signal processor may also recognize an object that is not an obstruction, such as a powerline.

Accordingly, some embodiments of the present disclosure include object-sensing systems. The object-sensing systems may be relatively low-power and lightweight, while still having a detection accuracy (e.g., sub-millimeter accuracy)

across a wide (e.g., at least three inches) space. These characteristics may facilitate use in powerline-crawling robotic systems that are configured to sense and avoid obstacles along powerlines, such as for fiber optic deployment along the powerlines.

As detailed above, the computing devices and systems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The following example embodiments are also included in the present disclosure.

Example 1: An object-sensing system, which may include: a light transmitter subsystem configured to generate a collimated linear beam of light at a predetermined wavelength and having a length of at least 3 inches; and a light receiver subsystem including a linear sensor array having a length of at least 3 inches, the light receiver subsystem positioned to receive the collimated linear beam of light and to detect shadows caused by objects blocking at least a portion of the collimated linear beam of light.

Example 2: The object-sensing system of Example 1, wherein the light transmitter subsystem includes: a laser light source; a collimator positioned and configured to collimate laser light from the laser light source into a collimated laser light beam; a Powell lens positioned and configured to form a linear fan of light from the collimated laser light beam; and a linear lens positioned and configured to convert the linear fan of light from the Powell lens into the collimated linear beam of light.

Example 3: The object-sensing system of Example 2, wherein the linear lens is selected from the group consisting of: a Fresnel lens; or a cylindrical lens.

Example 4: The object-sensing system of Example 2 or 3, wherein the Powell lens is positioned at a focal point of the linear lens.

Example 5: The object-sensing system of any of Examples 2 through 4, further including one or more plane mirrors between the Powell lens and the linear lens positioned to shorten a distance between the Powell lens and the linear lens.

Example 6: The object-sensing system of any of Examples 2 through 5, wherein the linear lens has a lateral width of 3 mm or less.

Example 7: The object-sensing system of any of Examples 1 through 6, wherein the light receiver subsystem further includes a band pass filter over the linear sensor array, the band pass filter configured to allow passage of light at the predetermined wavelength.

Example 8: The object-sensing system of any of Examples 1 through 7, wherein the light receiver subsystem further includes a louver film over the linear sensor array, the louver film configured to allow passage of light at an angle of the collimated linear beam of light.

Example 9: The object-sensing system of any of Examples 1 through 8, wherein the object-sensing system has a mass of less than 400 grams.

Example 10: The object-sensing system of any of Examples 1 through 9, wherein the light transmitter subsystem is configured to generate the collimated linear beam of light having a length of at least 5 inches and the linear sensor array has a length of at least 5 inches.

Example 11: The object-sensing system of any of Examples 1 through 10, wherein the linear sensor array has a width of one to five sensor pixels.

Example 12: The object-sensing system of Example 11, wherein the linear sensor array has a width of only one sensor pixel.

Example 13: The object-sensing system of any of Examples 1 through 12, wherein the linear sensor array has a resolution of at least 200 pixels per inch in length.

Example 14: The object-sensing system of Example 13, wherein the linear sensor array has a resolution of at least 300 pixels per inch in length.

Example 15: The object-sensing system of any of Examples 1 through 14, wherein the predetermined wavelength is an infrared wavelength.

Example 16: A robotic system for suspending cable from an overhead powerline, the system including: a drive subsystem for driving the robotic system along the powerline; an obstacle detection subsystem for detecting obstacles along the powerline, the obstacle detection subsystem including; a light transmitter subsystem positioned on a first side of the powerline and configured to generate a collimated linear beam of light having a length of at least 3 inches; and a light receiver subsystem positioned on a second, opposite side of the powerline and including a linear sensor array having a length of at least 3 inches, the light receiver subsystem positioned to detect shadows caused by the obstacles blocking at least a portion of the collimated linear beam of light; and an extension subsystem for moving at least a portion of the robotic system to avoid the obstacles detected by the obstacle detection subsystem.

Example 17: The system of Example 16, wherein the light receiver subsystem includes: a band pass filter over the linear sensor array, the band pass filter configured to allow passage of light at a wavelength of the collimated linear beam of light; and a louver film over the linear sensor array, the louver film configured to allow passage of light at an angle of the collimated linear beam of light.

Example 18: The system of Example 16 or 17, wherein the light transmitter subsystem includes: a laser light source; a collimator positioned and configured to collimate laser light from the laser light source into a collimated laser light beam; a Powell lens positioned and configured to form a linear fan of light from the collimated laser light beam; and a linear lens positioned and configured to convert the linear fan of light from the Powell lens into the collimated linear beam of light.

Example 19: The system of any of Examples 16 through 18, wherein the collimated linear beam of light has a length of at least 5 inches and the linear sensor array has a length of at least 5 inches, a width of three or fewer pixels, and a resolution of at least 200 pixels per inch in length.

Example 20: A method of fabricating an object-sensing system, the method including: operatively coupling a collimator to a laser light source such that the collimator forms a collimated beam of light from laser light from the laser light source; positioning a Powell lens to receive the collimated beam of light and to form a linear fan of light from the collimated beam of light; positioning a linear lens to receive the linear fan of light and to form a collimated linear beam of light from the linear fan of light, the collimated linear beam of light having a length of at least 3 inches; and positioning a linear sensor array having a length of at least 3 inches to receive the collimated linear beam of light and to detect shadows caused by objects blocking at least a portion of the collimated linear beam of light.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An object-sensing system, comprising:
a light transmitter subsystem configured to generate a collimated linear beam of light at a predetermined wavelength and having a length of at least 3 inches, the light transmitter subsystem comprising:
a laser light source;
a collimator positioned and configured to collimate laser light from the laser light source into a collimated laser light beam;
a Powell lens positioned and configured to form a linear fan of light from the collimated laser light beam; and
a linear lens positioned and configured to convert the linear fan of light from the Powell lens into the collimated linear beam of light; and
a light receiver subsystem comprising a linear sensor array having a length of at least 3 inches, the light receiver subsystem positioned to receive the collimated linear beam of light from the linear lens, to detect shadows caused by objects blocking at least a portion of the collimated linear beam of light, and to determine a presence of obstacles based at least in part on the shadows caused by the objects exceeding a predetermined threshold size.

2. The object-sensing system of claim 1, wherein the linear lens is selected from the group consisting of:
a Fresnel lens; or
a cylindrical lens.

3. The object-sensing system of claim 1, wherein the Powell lens is positioned at a focal point of the linear lens.

4. The object-sensing system of claim 1, further comprising one or more plane mirrors between the Powell lens and the linear lens positioned to shorten a distance between the Powell lens and the linear lens.

5. The object-sensing system of claim 1, wherein the linear lens has a lateral width of 3 mm or less.

6. The object-sensing system of claim 1, wherein the light receiver subsystem further comprises a band pass filter over the linear sensor array, the band pass filter configured to allow passage of light at the predetermined wavelength.

7. The object-sensing system of claim 1, wherein the light receiver subsystem further comprises a louver film over the linear sensor array, the louver film configured to allow passage of light at an angle of the collimated linear beam of light.

8. The object-sensing system of claim 1, wherein the object-sensing system has a mass of less than 400 grams.

9. The object-sensing system of claim 1, wherein the light transmitter subsystem is configured to generate the collimated linear beam of light having a length of at least 5 inches and the linear sensor array has a length of at least 5 inches.

10. The object-sensing system of claim 1, wherein the linear sensor array has a width of one to five sensor pixels.

11. The object-sensing system of claim 10, wherein the linear sensor array has a width of only one sensor pixel.

12. The object-sensing system of claim 1, wherein the linear sensor array has a resolution of at least 200 pixels per inch in length.

13. The object-sensing system of claim 12, wherein the linear sensor array has a resolution of at least 300 pixels per inch in length.

14. The object-sensing system of claim 1, wherein the predetermined wavelength is an infrared wavelength.

15. A robotic system for suspending cable from an overhead powerline, the system comprising:
a drive subsystem for driving the robotic system along the powerline;
an obstacle detection subsystem for detecting obstacles along the powerline, the obstacle detection subsystem comprising:

a light transmitter subsystem positioned on a first side of the powerline and configured to generate a collimated linear beam of light having a length of at least 3 inches, the light transmitter subsystem comprising:

a laser light source;

a collimator positioned and configured to collimate laser light from the laser light source into a collimated laser light beam;

a Powell lens positioned and configured to form a linear fan of light from the collimated laser light beam; and a linear lens positioned and configured to convert the linear fan of light from the Powell lens into the collimated linear beam of light;

a light receiver subsystem positioned on a second, opposite side of the powerline and comprising a linear sensor array having a length of at least 3 inches, the light receiver subsystem positioned to receive the collimated linear beam from the linear lens, to detect shadows caused by the obstacles blocking at least a portion of the collimated linear beam of light, and to determine a presence of obstacles based at least in part on the shadows caused by the objects exceeding a predetermined threshold size, wherein the predetermined threshold size is defined by a width of the powerline; and an extension subsystem for moving at least a portion of the robotic system to avoid the obstacles detected by the obstacle detection subsystem.

16. The system of claim 15, wherein the light receiver subsystem comprises:

a band pass filter over the linear sensor array, the band pass filter configured to allow passage of light at a wavelength of the collimated linear beam of light; and a louver film over the linear sensor array, the louver film configured to allow passage of light at an angle of the collimated linear beam of light.

17. The system of claim 15, wherein the collimated linear beam of light has a length of at least 5 inches and the linear sensor array has a length of at least 5 inches, a width of three or fewer pixels, and a resolution of at least 200 pixels per inch in length.

18. A method of fabricating an object-sensing system, the method comprising:

operatively coupling a collimator to a laser light source such that the collimator forms a collimated beam of light from laser light from the laser light source;

positioning a Powell lens to receive the collimated beam of light and to form a linear fan of light from the collimated beam of light;

positioning a linear lens to receive the linear fan of light and to form a collimated linear beam of light from the linear fan of light, the collimated linear beam of light having a length of at least 3 inches;

positioning a linear sensor array having a length of at least 3 inches to receive the collimated linear beam of light from the linear lens, and to detect shadows caused by objects blocking at least a portion of the collimated linear beam of light;

operatively coupling a signal processor to the linear sensor array, the signal processor configured to determine a presence of obstacles based at least in part on the shadows caused by the objects exceeding a predetermined threshold size.

* * * * *